United States Patent [19]

Cappuccilli

[11] Patent Number: 4,464,066

[45] Date of Patent: Aug. 7, 1984

[54] PROBE TERMINAL FOR TEMPERATURE MEASURING IN ENAMELLED REACTORS

[75] Inventor: Giorgio Cappuccilli, Perugia, Italy

[73] Assignee: Tycon S.p.A., Italy

[21] Appl. No.: 495,220

[22] Filed: May 18, 1983

Related U.S. Application Data

[63] Continuation of Ser. No. 334,546, Dec. 28, 1981, abandoned, which is a continuation of Ser. No. 108,391, Dec. 28, 1979, abandoned.

[30] Foreign Application Priority Data

Jan. 22, 1979 [IT]  Italy ............................. 20556/79[U]

[51] Int. Cl.³ ........................ F16K 37/00; G01K 1/14
[52] U.S. Cl. ................................... 374/141; 136/233; 136/242; 374/179; 374/208
[58] Field of Search .................. 374/179, 141, 4, 12, 374/208; 376/247; 136/230–233, 242; 116/208; 324/65 CR

[56] References Cited

U.S. PATENT DOCUMENTS

| | | | |
|---|---|---|---|
| 2,208,332 | 7/1940 | Rossheim | 136/230 X |
| 2,516,952 | 8/1950 | Bristol | 136/233 X |
| 2,699,059 | 1/1955 | Whitehouse | 374/4 |
| 2,766,440 | 10/1956 | Marsden, Jr. | 136/233 X |
| 2,844,637 | 7/1958 | Borel et al. | 136/232 |
| 3,154,060 | 10/1964 | Hundere | 374/144 X |
| 3,181,629 | 5/1965 | Birman | 374/141 X |
| 3,376,170 | 4/1968 | Logan et al. | 136/233 |
| 3,453,151 | 7/1969 | Fox | 374/4 |
| 3,533,288 | 10/1970 | Franck | 374/141 X |
| 3,563,808 | 2/1971 | Scharbach et al. | 136/230 |
| 3,765,242 | 10/1973 | Baillen | 374/179 |
| 3,911,727 | 10/1975 | Katsuta et al. | 374/4 |
| 4,159,447 | 6/1979 | Gernhardt et al. | 374/4 |
| 4,305,286 | 12/1981 | Beuth et al. | 376/141 X |

FOREIGN PATENT DOCUMENTS

| | | | |
|---|---|---|---|
| 1293478 | 12/1969 | Fed. Rep. of Germany | 374/179 |
| 1648277 | 12/1971 | Fed. Rep. of Germany | 374/179 |
| 2123371 | 10/1972 | Fed. Rep. of Germany | 374/179 |

OTHER PUBLICATIONS

"Mesures et Controles", De Dietrich Brochure, 4 pp., May, 1976, (Glass Lined, Thermocouple, Vessel).

Primary Examiner—Daniel M. Yasich
Attorney, Agent, or Firm—Morgan, Finnegan, Pine, Foley & Lee

[57] ABSTRACT

A probe terminal for measuring the temperature inside of an enamelled reactor, for allowing a high speed of response to change in temperature and for detecting damage to the enamel of the reactor comprising a hollow cylindrical metal body provided at one end of a base in which is inserted and anchored, with enamel, a platinum cylinder hollow, the base of the platinum cylinder being unlined and in alignment with the enamel which coats the external surface of the hollow cylindrical metal body base, i.e., HCMB. One end of the HCMB contains the platinum cylinder. The other end of the HCMB is provided with means for attachment to the probe.

4 Claims, 4 Drawing Figures

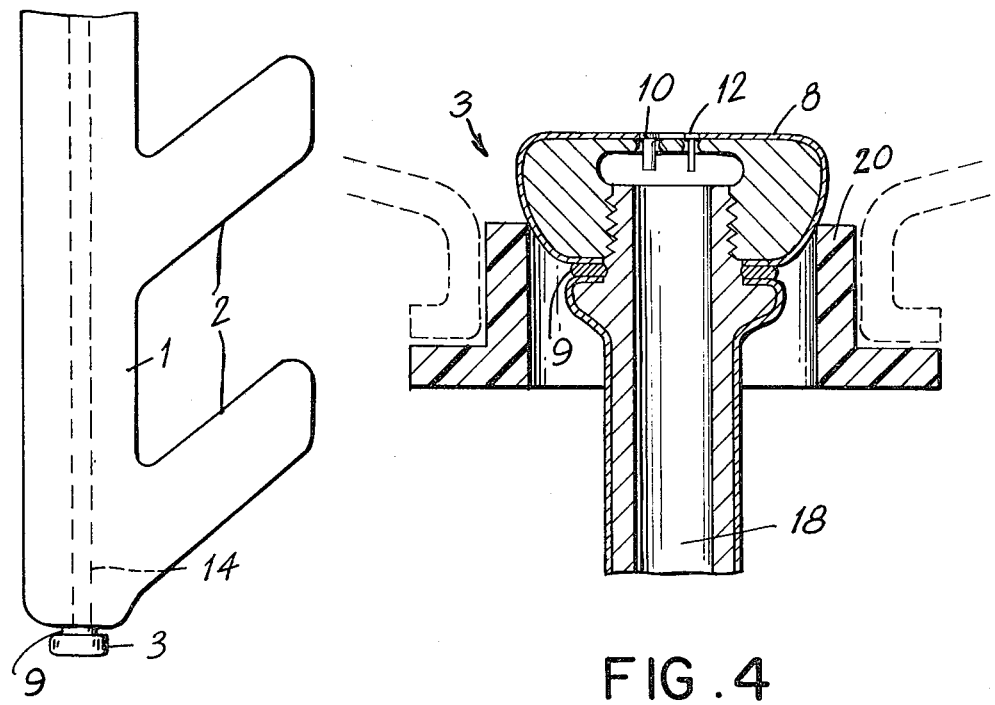
FIG. 1
FIG. 4
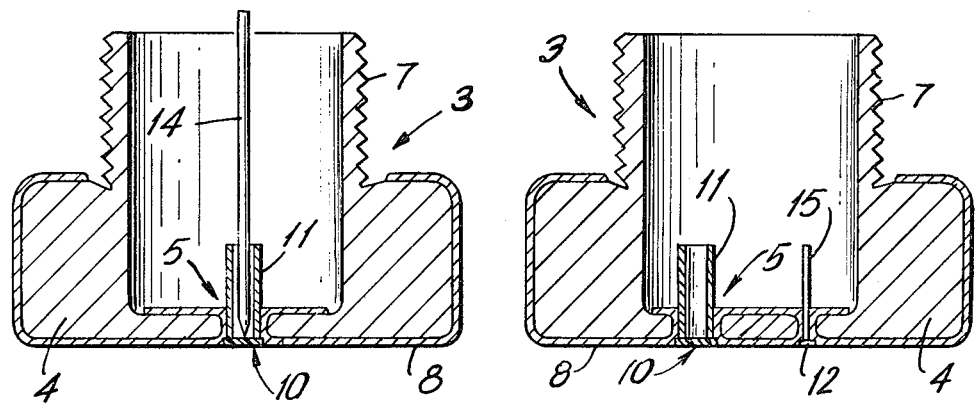
FIG. 2
FIG. 3

PROBE TERMINAL FOR TEMPERATURE MEASURING IN ENAMELLED REACTORS

BACKGROUND OF THE INVENTION

This invention relates to a probe terminal for installation in an enamelled apparatus, which is suitable for measuring the internal temperature of the apparatus and for detecting any damage to the enamelled lining. The term "apparatus" as used hereinafter denotes an internally enamelled reactor, container, vessel or the like, which is generally of steel construction. Such enamelled apparatus are used generally for processing highly corrosive liquids, suspensions and sludges, which are indicated hereinafter by the term "liquids" for simplicity.

The term "probe", as used hereinafter, indicates any element which can support the terminal of the present invention. A thermometer sheath, a baffle, a valve head, or the like, can be used as "probe".

In enamelled apparatus used in the chemical industry, temperature is measured by a thermocouple or a resistance thermometer (e.g. a Pt 100, i.e. a platinum wire which has a resistance of 100 ohms at 0° C.) inserted into a probe and connected at its top end to the temperature measurement and alarm instrument, which gives an alarm whenever the temperature exceeds the set limit.

The following are used for measuring temperature by conventional methods:

(a) an enamelled steel probe fitted with a terminal constructed entirely of tantalum and screwed into the lower end of the probe by way of a TEFLON (PTFE) seal gasket. Said terminal comprises a lower cylindrical end abutting from the terminal, which houses the thermocouple junction generally immersed in oil;

(b) a completely enamelled steel probe in which the thermocouple conductors are inside the probe, in which lower end is inserted the thermocouple junction generally immersed in oil.

Obviously a Pt 100 resistance thermometer or any other suitable thermometer, e.g. a mercury thermometer, can be used instead of a thermocouple.

When temperature is measured by method (a), there is rapid response to sudden temperature variations, and a greater sensitivity than method (b), in which the enamel layer acts as a heat insulant, and considerably slows down the heat flow.

Further in regard of method (a) it must be added that tantalum or gold-platinum have to be covered with expensive corrosion resistant metal when positioned into a heated agitator type reaction vessel, thus we note increasing the time lag of the response. See German Pat. No. 1.648.227, column 1.

However, measurement by method (b) obviates the corrosion problems and dangers of incrustation which can arise when using a tantalum terminal. In German Pat. Nos. 1648277 and 2123371, the thermocouple or resistance thermometer wires are fitted on the outside of the probe between one layer of enamel and another. However, the methods of said patents require the entire probe to be replaced when the thermo-sensitive element is damaged.

SUMMARY OF THE INVENTION

The present invention obviates the drawbacks of the known art, and provides further advantages which will be apparent to the expert from the following description.

This object is attained according to the present invention by providing a terminal for measuring the temperature inside of an enamelled reactor, allowing a high speed of response to change in temperature and for detecting possible damage to the enamel, comprising: a hollow cylindrical metal body, i.e. HCMB 3, provided at one end with a base having a bore 5 of a diameter greater than that of a platinum cylinder 11, and provided at the other end with means to anchor it to a probe; said platinum cylinder 11 provided with a base 10 and inserted in the HCMB base, the bases 4 of the HCMB and 10 of the Pt cylinder being at the same side; and an enamel 8 coating the external and partly internal surface of the HCMB, the walls of the said bore 5 and also the corresponding walls of the Pt cylinder 11 being mutually anchored in place by the enamel 8 which electrically insulates the Pt cylinder from the metal body; the outer surface of the Pt cylinder 10 being uncoated, in direct contact with the liquid in the reactor and flush with the enamelled base of the HCMB; a thermocouple 14 inserted in cylinder 11 and placed on base 10 of the same.

Any suitable material can be used for said hollow body (however, steel is generally used for technical and economical reasons), and the same is valid for the material of the cylinder, which could also have other suitable shapes. The terminal is connected to the probe preferably by providing the hollow body with a threaded sleeve.

The seal can be provided by means of a TEFLON (PTFE) gasket.

The aforesaid probe-terminal assembly constitutes one which is almost completely enamelled. The only no-enamelled parts are the gasket edge and the small platinum circle which is in line with the enamel coating of the terminal.

The hollow platinum cylinder usually has an inner diameter less than 6 mm, and its base has a thickness of 0.2 to 0.6 mm, preferably about 0.4 mm, for in-line mounting. The smaller values are used for unpressurised apparatus Preferably, the diameter of the cylinder base is slightly greater than the cylinder diameter itself.

As the thermocouple junction is separated from the liquid only by the platinum plate of said thickness, it is clear that the thermocouple gives an extremely rapid response for any temperature variation. It has also been surprisingly found that there is no tendency for incrustations to form on the terminal according to the invention. This and the proceeding property are of great interest in that they allow the apparatus to be operated reliably even when the main reaction is accompanied by a possible secondary reaction of explosive character. The terminal according to the invention also has the advantage of being able to be connected to the known device for detecting enamel porosity.

To this end, the terminal is fitted both with the hollow platinum cylinder and with the solid one hereinafter named pin which is fitted to the terminal through a second bore, in a manner similar to that described for the cylinder.

The pin is connected to the detection device, with which a certain potential difference is applied between the steel of the apparatus and the pin electrode. If the enamel is damaged, the circuit formed by the steel of the apparatus, the liquid, the electrode, the detection instrument and the steel closes, sounds the alarm.

A further electrode, which can be the actual cylinder used for measuring the liquid temperature, is connected electrically to the detection device in order to enable the instrument to be periodically checked.

The enamelled terminal can be fitted not only to the probe, but also to other inserts or accessories of the enamelled apparatus, and in particular, in slightly modified form, to the head of the bottom valve of the apparatus. Using this latter method, the TEFLON gasket inserted between the head and rod is no longer in contact with the liquid, except during discharge. As stated, the basic metal of the enamelled apparatus, probe and terminal is generally steel, but it is apparent that other conducting metals can be advantageously used instead.

The invention is described in greater detail by way of non-limiting example with reference to the following drawings, in which:

BRIEF DESCRIPTION OF THE DRAWINGS

FIG. 1 is an elevation of a baffle with the terminal according to the invention fitted;

FIG. 2 is an axial section through the terminal of FIG. 1, fitted with a cylinder for measuring the liquid temperature;

FIG. 3 is an axial section through the terminal according to the invention, which is further fitted with a pin for detecting enamel porosity or damage;

FIG. 4 is a partial section through the discharge mouth of a valve connected to an enamelled apparatus and fitted with the terminal according to the invention.

DESCRIPTION OF THE PREFERRED EMBODIMENTS

In the figures the reference numeral 1 indicates an enamelled baffle of the type comprising a comb 2 and provided with a terminal 3, wherefrom it extends the thermocouple 14 also shown in dashed lines. The Pt cylinder 11 with base 10 and/or the Pt pin 15 with base 12 are anchored to the terminal base 4 by means of coating enamel 8 which insulates them electrically from the underlying steel.

The terminal 3 is provided with the thermocouple 14 for detecting the liquid temperature and/or with a Pt pin 15 conveniently connected to a generator, not shown, for monitoring any damages in the enamel of the reactor.

In FIG. 4, the terminal 3 is apparently modified to act as a bottom discharge valve, provided with TEFLON sealing gasket 20, and a bored rod 18. IN FIGS. 2 and 3, 7 represents the means to anchor the terminal 3 with the baffle 1.

I claim:

1. A terminal for measuring the temperature inside of an enamelled reactor, allowing a high speed of response to change in temperature, and for detecting possible damage to the enamel comprising:

a hollow cylindrical metal body provided at one end with a base having a bore and provided at the other end with means to anchor said body to a probe;

a platinum cylinder provided with a base and inserted in said bore of said metal body base, the bases of said metal body and of said platinum cylinder being on the same side;

an enamel coating the external surface of said body and the walls of the said bore, the corresponding walls of the platinum cylinder being mutually anchored in place by the enamel; the outer surface of the platinum cylinder base being uncoated, in direct contact with the liquid in the reactor and in alignment with the enamelled base of the body, and the platinum cylinder being electrically insulated from the metal body, in order to act as an electrode to detect damage to the enamel; and a thermocouple inserted in said platinum cylinder and placed on the base of said platinum cylinder.

2. A terminal according to claim 1, arranged in the bottom of the reactor, with the base of the cylindrical metal body placed upwardly, adapted to act as a bottom discharging valve provided with a bored rod and sealing gasket.

3. A terminal according to claim 1 in which the base of the cylindrical metal body is provided with a second bore in which is inserted a platinum pin electrically insulated from the metal body and in contact with the liquid in the reactor, and acting as an electrode for detecting damages to the enamel.

4. A terminal according to claim 3 in which the base of the cylindrical metal body is provided with a second bore in which is inserted a platinum pin electrically insulated from the metal body and in contact with the liquid in the reactor, and acting as an electrode for detecting damage to the enamel.

* * * * *